United States Patent [19]

Goldstein

[11] Patent Number: 4,722,825

[45] Date of Patent: Feb. 2, 1988

[54] METHOD OF FABRICATING A METAL/CERAMIC COMPOSITE STRUCTURE

[75] Inventor: David Goldstein, Adelphi, Md.

[73] Assignee: The United States of America as represented by the Secretary of the Navy, Washington, D.C.

[21] Appl. No.: 68,395

[22] Filed: Jul. 1, 1987

[51] Int. Cl.[4] .............................................. B22F 7/00
[52] U.S. Cl. ........................................ 419/8; 42/76.02; 89/16; 419/9; 419/13; 419/17; 419/19; 419/26; 419/28; 419/49; 419/60; 419/68
[58] Field of Search .................... 419/8, 60, 9, 68, 13, 419/26, 17, 28, 19, 49; 89/16; 42/76.02

[56] References Cited

U.S. PATENT DOCUMENTS

| | | | |
|---|---|---|---|
| 3,900,317 | 8/1975 | Meadus et al. | 419/1 |
| 4,426,248 | 1/1984 | Jackson | 419/6 |
| 4,491,557 | 1/1985 | Breitmoser et al. | 419/5 |
| 4,537,742 | 8/1985 | Siemers et al. | 419/5 |
| 4,564,501 | 1/1986 | Goldstein | 419/26 |
| 4,665,828 | 5/1987 | Aver | 419/6 |

Primary Examiner—Stephen J. Lechert, Jr.
Attorney, Agent, or Firm—Kenneth E. Walden; Roger D. Johnson

[57] ABSTRACT

A method of producing a metal/ceramic composite structure in which an unconsolidated metal or metal alloy powder is loaded into a sealable glass mold comprising a hollow ceramic sleeve and a sealable outer glass envelope surrounding the ceramic sleeve and forming with the outer wall of the ceramic sleeve a sealable chamber for the metal or metal alloy powder, wherein the glass is a type which becomes plastic when heated. The air in the mold is removed under vacuum and the mold is sealed and placed into a free flowing refractory powder in a crucible and consolidated by sintering under atmospheric pressure (CAP ® process). Removal of the glass envelope leaves a composite article having a consolidated metal or metal alloy layer surrounding and placing a hollow ceramic liner (sleeve) under both radial and axial compression. A ceramic-line metal gun barrel insert can be produced by using a ceramic sleeve with rifling on its inner surface.

9 Claims, 2 Drawing Figures

METHOD OF FABRICATING A METAL/CERAMIC COMPOSITE STRUCTURE

BACKGROUND OF THE INVENTION

This invention relates to gun barrels and more particularly to liner inserts for gun barrels.

Metal inserts for gun barrels wear out under the combined pressures, temperatures, friction effects and possibly chemical attacks of each round propelled through them. The inserts may need replacement after a few thousand rounds.

It has been proposed that ceramic-lined metal inserts be used. However, conventional methods of manufacturing ceramic-lined metal inserts of sufficient strength would be very expensive. What is needed is a relatively inexpensive method of making strong ceramic-lined metal inserts.

SUMMARY OF THE INVENTION

Accordingly, an object of this invention is to provide a new method of producing metal/ceramic composite articles.

Another object of this invention is to provide a new method of producing ceramic-lined metal inserts for gun barrels.

A further object of this invention is to provide a new method of producing high quality ceramic-lined metal inserts for gun barrels.

These and other objects of this invention are achieved by providing:

A method of producing a metal/ceramic composite structure comprising:

(a) loading unconsolidated metal or metal alloy powder into a sealable glass mold comprising a hollow ceramic sleeve and a sealable outer glass envelope surrounding the ceramic sleeve and forming with the outer wall of the ceramic sleeve a sealable chamber for the metal or metal alloy powder, wherein the glass is of a type that becomes plastic when heated;

(b) evacuating the atmosphere from the metal or metal alloy powder filled chamber in the mold;

(c) sealing the chamber;

(d) placing the mold in an open top refractory container and packing with free flowing refractory powder selected to freely flow at all the temperatures in the process;

(e) heating the mold and the metal or metal alloy contents of the mold at a temperature at which sintering of the metal or metal alloy powder takes place and holding at this temperature for a time sufficient to cause substantially complete densification of the powered metal or metal alloy, during which step the mold is supported by the free flowing refractory powder as the glass sleeve and the glass envelope become plastic and the mold shrinks in volume as its metal or metal contents densify and are compressed against the hollow ceramic sleeve;

(f) cooling and removing the glass portion of the mold to leave a composite article comprising the consolidated metal or metal alloy layer surrounding and placing the hollow ceramic sleeve under both axial and radial compression.

A ceramic-lined metal insert for gun barrels is produced by using a hollow ceramic sleeve with rifling on its inner surface.

BRIEF DESCRIPTION OF THE DRAWINGS

A more complete understanding of the invention and of many of the attendant advantages thereof will be readily appreciated as the same becomes better understood by reference to the accompanying drawings in which.

DETAILED DESCRIPTION OF THE PREFERRED EMBODIMENT

Figure 1:
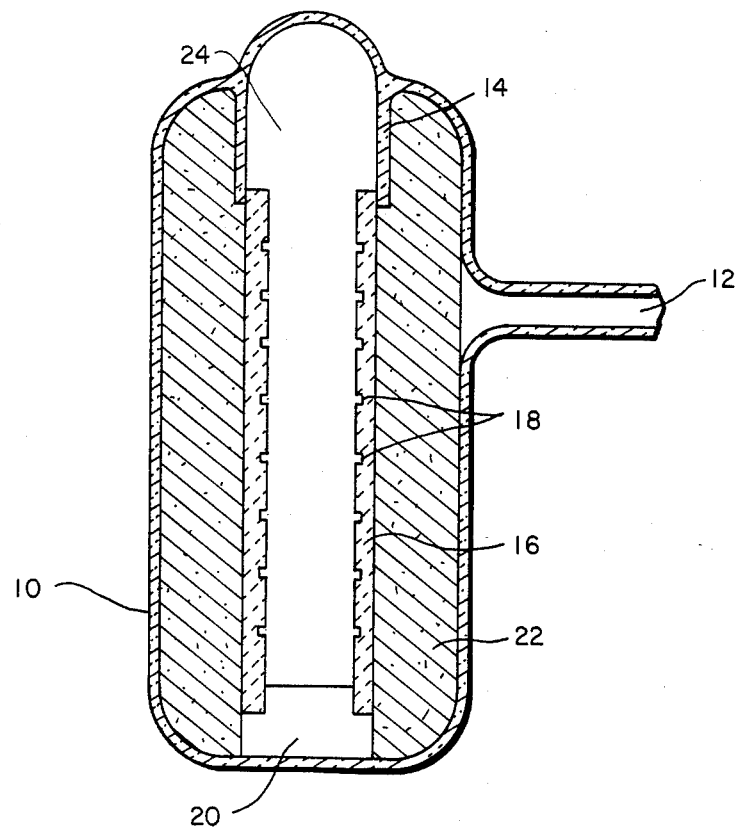
FIG. 1 shows a cross-sectional view of a typical glass envelope mold with a ceramic liner sleeve and metal powder precusor for the metal sleeve.

Referring to FIG. 1, a cylindrical glass envelope mold 10 with a port 12 in the glass envelope 10 is shown. A hollow cylindrical ceramic sleeve 16 is centered and held into place by cylindrical glass centering sleeve 14 extending down from the top of the glass envelope 10 and by a graphite plug structure 20 at the bottom. The central space 24 inside the ceramic sleeve 16 and glass centering sleeve 14 is filled with graphite flakes to prevent metal powders from infiltrating the central space 24. The graphite flakes are unaffected by the process and can be readily poured out after the process to be used again. The ceramic sleeve 16, glass centering sleeve 14, graphite plug structure 20, and glass envelope 10 define an annular chamber 22 which is filled with a metal or metal alloy powder through the port 12 in the glass envelope 10. Note for some applications, such as in engine or pump cylinders, the inner wall of the ceramic sleeve 16 will be smooth. However, for ceramic-lined metal inserts for gun barrels, the inner surface of the ceramic sleeve 16 will have the appropriate rifling 18.

Next the air is removed from chamber 22 under vacuum through port 12 and the port 12 is sealed. This step may be accompanied by mild heating to drive off gases occluded on the metal or metal alloy particles. After this step is completed, annular chamber 22 is under vacuum and glass envelope 10 is completely sealed.

The alloy powder is next consolidated using the CAP® process as disclosed in U.S. Pat. No. 4,227,927, entitled "Powder Metallurgy," which issued to Herbert L. Black et al. on Oct. 14, 1980, herein incorporated by reference. Black et al. (in claim 1, col. 4, lines 19–31) summarize the next steps to be taken as follows:

"(d) placing the mold in an open top refractory container and packing with free refractory powder selected to freely flow at all the temperatures encountered in the process, (e) heating the mold and contents of the mold to a temperature at which sintering of the powder metal takes place and holding at this temperature for a time sufficient to cause substantially complete densification of the powder metal, (f) cooling and removing the mold to recover a dense article, and whereby the glass mold is supported by the free flowing refractory powder as the mold becomes plastic and shrinks in volume as its contents densify."

The CAP® processing results in the metal alloy powders being sintered into solid alloy masses with densities as high as 99 percent of theoretical.

During CAP® processing, the powders densify into a cylindrical solid wall or tube 26 (see FIG. 2) that is of reduced diameter and length, exerting both axial and radial compressive forces upon the ceramic sleeve 16.

Upon cooling from the sintering temperature the glass envelope 10 (see FIG. 1) self strips due to the differential rates of contraction of the metal or metal alloy and the glass. After cooling, any remaining glass is removed and the graphite flakes are poured out.

Figure 2:
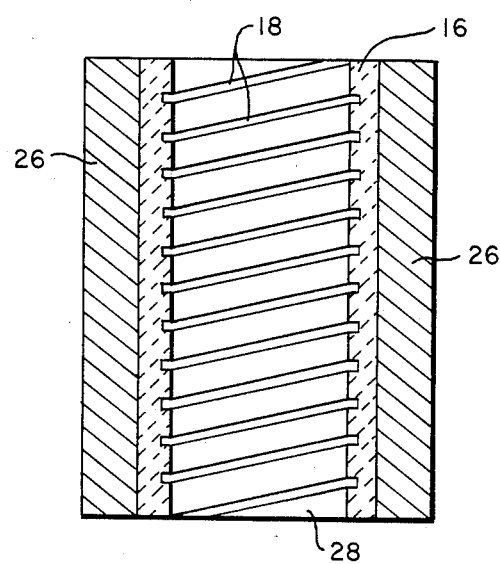
FIG. 2 shows a cross-sectional view of a typic metal-ceramic composite gun barrel insert produced by the consolidation step in the method of this invention.

FIG. 2 shows a cross-section of a ceramic-lined metal gun barrel insert with a consolidated metal or metal alloy tube 26 surrounding the ceramic liner (or sleeve) 16 which encircles a cylindrical space 28. The ceramic liner 16 has the appropriate rifling 18 on its inner surface. The unrelieved axial and radial compressive forces exerted on the ceramic liner 16 by the consolidated metal or metal alloy tube 26 make the composite structure exceedingly resistant to fracture. The external surfaces of the metal or metal alloy tube 26 may be machined concentric with the ceramic sleeve 16.

For greater metal or metal alloy density and greater compression on the ceramic liner, a modification of the CAP® process may be used. This procedure is disclosed in U.S. Pat. No. 4,564,501, entitled "Applying Pressure While Article Cools," which issued on Jan. 14, 1986, to David Goldstein, herein incorporated by reference. Goldstein (col. 3, line 16-29) summarizes this modification the the CAP® process as follows:

"Another application of this slow cooling under pressure modifications is to obtain greater density in the nickel-titanium alloys objects than can be obtained by the unmodified CAP® process. The conventional CAP® process is used up to the cooling step. The clay-graphite container (including refractory powder, glass molds, nickel-titanium alloy object) is transferred directly to an insulated container which is placed in a pressure chamber. The insulated container is not air tight so that the pressure in the chamber will be felt on the glass molds. A pressure of 15,000 psi or more, preferably 40,000 psi or more, and more preferably from 100,000 to 200,000 psi is applied during cooling. In this manner a high density product is achievable without hot working."

Glasses which do not react appreciably with the metal alloy and which are plastic at the sintering temperature may be used in the method of this invention. The glasses should also be resistant to chemicals and to physical erosion. Borosilicate glasses are examples of suitable glasses.

By selecting appropriate sintering times and temperatures, a wide variety of metals and alloys may be used in the method of this invention. A preferred group of alloys is the NITINOL family of alloys. The NITINOL alloys have excellent oxidation resistance even at 800° F. Specific examples of NITINOL alloys which may be used in the present method include those containing from 38 to 47, and preferably from 42 to 46 weight percent of titanium, from zero to about 6 weight percent of an additive metal which is cobalt, iron, or mixtures thereof, with the remainder of the alloy being nickel. When the additive metal is omitted (zero weight percent) the alloy is binary (Ti-Ni). A small amount of other elements may be present without significantly affecting the properties of the NITINOL alloys.

For NITINOL alloys the preferred particle size is −60 mesh with −100 mesh being more preferred. For other metals and alloys particle size may be varied according to the diffusion constant at the sintering temperature and the properties desired in the final product.

Any strong, wear-resistant, heat-resistant ceramic material may be used to form the ceramic sleeves. Some examples of suitable ceramics are alumina, silicon carbide, silicon nitride, and titanium carbide. Titanium carbide because of its hardness is most preferred for use in ceramic-lined metal gun barrel inserts.

Although cylindrical composite structures appear to be the most useful, the present process is not limited to the production of these. Referring to FIG. 1, by selecting different shaped ceramic sleeves 16 and glass envelopes 10, a wide variety of shapes may be produced. For example, round cornered triangular, round cornered rectangular, round cornered pentagonal, round cornered hexagonal, round cornered octagonal structures are possible. Even irregular shapes may be produced by this process.

To those skilled in the art, many modifications and variations of the present invention are possible inlight of the above teachings. It is therefore to be understood that the present invention can be practiced otherwise than as specifically described herein and still be within the spirit and scope of the appended claims.

What is claimed is:

1. A method of producing a metal/ceramic composite structure comprising:
   (a) loading unconsolidated metal or metal alloy powder into a sealable glass mold comprising a hollow ceramic sleeve and a sealable outer glass envelope surrounding the ceramic sleeve and forming with the outer wall of the ceramic sleeve a sealable chamber for the metal or metal alloy powder, wherein the glass is of a type that becomes plastic when heated;
   (b) evacuating the atmosphere from the metal or metal alloy powder filled chamber in the mold;
   (c) sealing the chamber;
   (d) placing the mold in an open top refractory container and packing with free flowing refractory powder selected to freely flow at all the temperatures in the process;
   (e) heating the mold and the metal or metal alloy contents of the mold at a temperature at which sintering of the metal or metal alloy powder takes place and holding at this temperature for a time sufficient to cause substantially complete densification of the powered metal or metal alloy, during which step the mold is supported by the free flowing refractory powder as the glass sleeve and the glass envelope become plastic and the mold shrinks in volume as its metal or metal contents densify and are compressed against the hollow ceramic sleeve;
   (f) cooling and removing the glass portion of the mold to leave a composite article comprising the consolidated metal or metal alloy layer surrounding and placing the hollow ceramic sleeve under both axial and radial compression.

2. The method of claim 1 which further comprises after step (e) but before step (f), transferring the open top refractory container, refractory powder, and mold directly into an insulated, refractory lined covered container and then placing the covered container into a pressure chamber and applying an isostatic pressure of 2,000 psi or more to the mold while it slowly cools down.

3. The method of claim 1 wherein the glass used is a borosilicate glass.

4. The method of claim 1 wherein an unconsolidated metal alloy powder comprising from 38 to 47 weight percent of titanium, from zero to 6 weight percent of an additive metal selected from the group consisting of cobalt, iron, and mixtures thereof, with the remainder of the alloy being essentially nickel.

5. The method of claim 4 wherein the alloy comprises from 42 to 46 weight percent of titanium.

6. The method of claim 4 wherein the weight percent of additive metal in the alloy is zero.

7. The method of claim 1 which is used to produce a composite article which is a gun barrel insert by using a hollow ceramic sleeve which has rifling on its inner surface.

8. The method of claim 1 wherein the ceramic sleeve is made of a ceramic material selected from the group consisting of alumina, silicon carbide, silicon nitride, and titanium carbide.

9. The method of claim 8 wherein the ceramic sleeve is made of titanium carbide.

* * * * *